US011332183B2

(12) United States Patent
Boos (10) Patent No.: US 11,332,183 B2
(45) Date of Patent: May 17, 2022

(54) METHOD FOR OPERATING A STEERING SYSTEM, AND STEERING SYSTEM (71) Applicant: Robert Bosch GmbH, Stuttgart (DE)

(72) Inventor: Nicolas Boos, Mutlangen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/762,808

(22) PCT Filed: Oct. 12, 2018

(86) PCT No.: PCT/EP2018/077894
§ 371 (c)(1),
(2) Date: May 8, 2020

(87) PCT Pub. No.: WO2019/101430
PCT Pub. Date: May 31, 2019

(65) Prior Publication Data
US 2021/0179167 A1 Jun. 17, 2021

(30) Foreign Application Priority Data
Nov. 23, 2017 (DE) ...................... 10 2017 220 929.1

(51) Int. Cl.
B62D 5/04 (2006.01)
B62D 6/00 (2006.01)
B62D 6/10 (2006.01)

(52) U.S. Cl.
CPC ......... *B62D 5/0463* (2013.01); *B62D 5/0481* (2013.01); *B62D 6/002* (2013.01); *B62D 6/10* (2013.01)

(58) Field of Classification Search
CPC .... B62D 5/0463; B62D 5/0481; B62D 6/002; B62D 6/10
See application file for complete search history.

(56) References Cited

U.S. PATENT DOCUMENTS 4,732,055 A * 3/1988 Tateno .................... F16H 59/54
477/73
10,214,234 B2 * 2/2019 Kim .......................... B62D 6/02
(Continued)

FOREIGN PATENT DOCUMENTS

DE 10 2004 026 147 A1 2/2005
DE 10 2006 033 458 A1 1/2007
(Continued)

OTHER PUBLICATIONS

"Driver-vehicle closed-loop simulation of differential drive assist steering control system for motorized-wheel electric vehicle;" Qingnian Wang, Junnian Wang, Liqiang Jin; 2009 IEEE Vehicle Power and Propulsion Conference (pp. 564-571); Sep. 1, 2009.*
(Continued)

*Primary Examiner* — Khoi H Tran
*Assistant Examiner* — Jorge O Peche
(74) *Attorney, Agent, or Firm* — Maginot, Moore & Beck LLP (57) ABSTRACT A method for operating a steering system of a motor vehicle includes ascertaining a first torque depending on a target steering rack position and depending on the actual steering rack position, ascertaining a second torque depending on a vehicle speed, ascertaining a supporting torque depending on the first and the second torques, and introducing the supporting torque into a steering gear of the steering system.

12 Claims, 7 Drawing Sheets

(56) References Cited

U.S. PATENT DOCUMENTS

| | | | | |
|---|---|---|---|---|
| 2003/0204294 | A1* | 10/2003 | Gluch | B62D 5/0457 |
| | | | | 701/41 |
| 2004/0256171 | A1* | 12/2004 | Sugitani | B62D 6/002 |
| | | | | 180/402 |
| 2006/0234537 | A1* | 10/2006 | Sugitani | B62D 5/003 |
| | | | | 439/164 |
| 2009/0114470 | A1* | 5/2009 | Shimizu | B62D 5/04 |
| | | | | 180/444 |
| 2012/0024615 | A1 | 2/2012 | Von Tardy-Tuch et al. | |
| 2014/0343790 | A1 | 11/2014 | Hestermeyer et al. | |
| 2017/0327145 | A1* | 11/2017 | Sakaguchi | B62D 5/0469 |
| 2018/0072343 | A1* | 3/2018 | Sugita | B62D 6/008 |
| 2018/0186399 | A1* | 7/2018 | Kim | B62D 7/159 |
| 2019/0355187 | A1* | 11/2019 | Frankovics | B62D 5/0481 |
| 2019/0367084 | A1* | 12/2019 | Hong | B62D 5/0469 |
| 2020/0262473 | A1* | 8/2020 | Kreis | B62D 5/001 |
| 2020/0269903 | A1* | 8/2020 | Anraku | B62D 6/04 |
| 2020/0353976 | A1* | 11/2020 | Pramod | B62D 6/002 |
| 2021/0046972 | A1* | 2/2021 | Fujita | B62D 5/0463 |
| 2021/0179167 | A1* | 6/2021 | Boos | B62D 6/002 |

FOREIGN PATENT DOCUMENTS

| | | | | |
|---|---|---|---|---|
| DE | 10 2008 032 081 A1 | | 1/2010 | |
| DE | 10 2009 000 638 A1 | | 8/2010 | |
| DE | 10 2012 102 279 A1 | | 9/2013 | |
| DE | 102013110848 | * | 4/2015 | |
| DE | 10 2015 006 491 A1 | | 11/2016 | |
| DE | 10 2016 215 724 A1 | | 2/2018 | |
| DE | 102017105370 A1 | * | 9/2018 | B62D 5/0463 |
| DE | 102017223288 A1 | * | 6/2019 | B62D 6/008 |
| EP | 3 196 098 A1 | | 7/2017 | |
| FR | 3106120 A1 | * | 7/2021 | B62D 15/025 |
| JP | 2003028074 A | * | 1/2003 | |
| JP | 2011-51420 A | | 3/2011 | |
| JP | 2015-58903 A | | 3/2015 | |
| JP | 2017-77849 A | | 4/2017 | |
| WO | WO 2012/004331 | * | 1/2012 | |
| WO | WO-2019011867 A1 | * | 1/2019 | B62D 5/006 |

OTHER PUBLICATIONS

"Modeling and simulation studies on differential drive assisted steering for EV with four-wheel-independent-drive;" Junnian Wang, Qingnian Wang, Liqiang Jin; 2008 IEEE Vehicle Power and Propulsion Conference (pp. 1-7); Feb. 9, 2009.*

International Search Report corresponding to PCT Application No. PCT/EP2018/077894, dated Jan. 29, 2019 (German and English language document) (7 pages).

* cited by examiner

METHOD FOR OPERATING A STEERING SYSTEM, AND STEERING SYSTEM

This application is a 35 U.S.C. § 371 National Stage Application of PCT/EP2018/077894, filed on Oct. 12, 2018, which claims the benefit of priority to Serial No. DE 10 2017 220 929.1, filed on Nov. 23, 2017 in Germany, the disclosures of which are incorporated herein by reference in their entirety.

BACKGROUND

The disclosure relates to a method for operating a steering system and a steering system.

It is known that the control path for a rack position control is highly nonlinear. The acting counterforces vary strongly depending on the current driving situation. For example, the friction of the wheels is highest at rest and decreases with increasing vehicle speed. The design of the axle can also markedly influence the variation of counterforces. Moreover, a counterforce and inertia originating from the steering wheel and steering column are introduced into the steering system and interact with the axle. As a result, today's rack position controllers are designed as a compromise for all operating points.

SUMMARY

The underlying problem of the prior art is solved by a method for operating a steering system and a steering system as disclosed herein.

The method includes: determining a first torque as a function of a target rack position and as a function of an actual rack position, determining a second torque as a function of a vehicle speed, determining a supporting torque as a function of the first and second torques, and introducing the supporting torque into a steering gear of the steering system.

Owing to the proposed method, the design of the controller is significantly simplified and the combination of control and pre-control can ensure a high performance of the controller at all operating points.

One advantageous embodiment is characterized in that the method includes: determination of a first partial torque of the second torque as a function of the actual rack position and as a function of the actual vehicle speed. In this way, counterforces in the sense of the first partial torque, which act in a static situation, i.e. at a constant vehicle speed and constant rack position, are pre-controlled.

One advantageous embodiment is characterized in that the method includes: determination of a second partial torque of the second torque as a function of an actual rack speed or a target rack speed and as a function of the vehicle speed. By taking into account the rack speed, it is possible using the vehicle speed to take into account the friction between the tire and the road for the pre-control.

One advantageous embodiment is characterized in that the method includes: determination of a third partial torque of the second torque as a function of a product of an actual rack acceleration or a target rack acceleration with a first factor that is predetermined, in particular determined in advance. By including the rack acceleration, an inertia of the power steering can be taken into account and compensated.

One advantageous embodiment is characterized in that the method comprises: determination of a fourth partial torque of the second torque as a function of a product of an actual torsion bar torque with a second factor that is predetermined, in particular determined in advance. Through the inclusion of the actual torsion bar torque, inertia and friction from the steering column and originating from the steering wheel are taken into account and compensated.

Another aspect concerns the steering system, wherein the steering system comprises a control unit, a drive unit and a steering gear. A first torque can be determined as a function of a target rack position and as a function of an actual rack position by a position sensor. A second torque can be detected as a function of the vehicle speed by a speed sensor. A supporting torque can be determined as a function of the first torque and the second torque. The supporting torque can be introduced into the steering gear of the steering system by means of the drive unit.

BRIEF DESCRIPTION OF THE DRAWINGS

Further embodiments and features of the disclosure can also be found in the following description of the exemplary embodiment. In the drawings.

DETAILED DESCRIPTION

Figure 1:
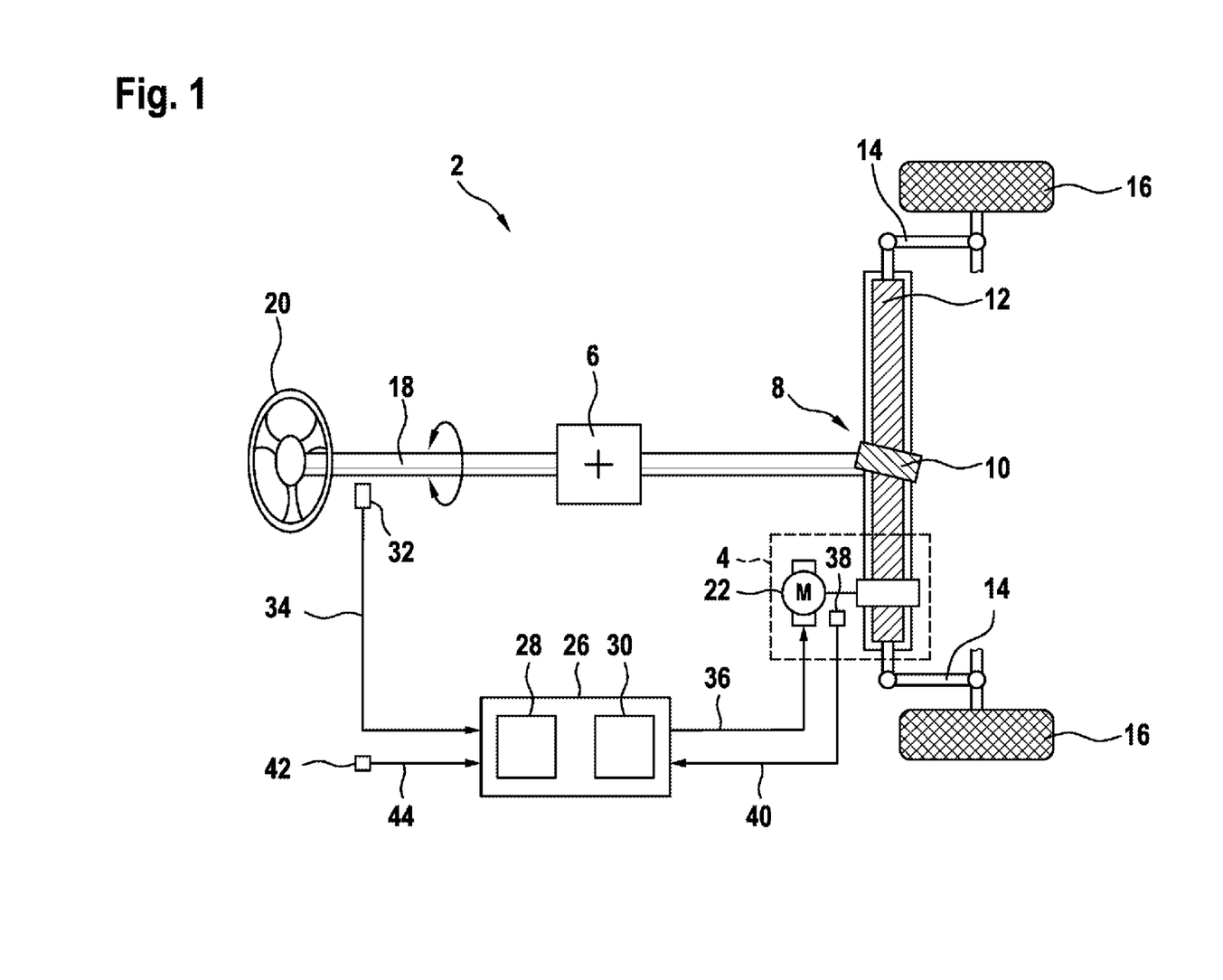
FIG. 1 shows a steering system in a schematic form.

FIG. 1 shows in schematic form a steering system 2 with power steering 4. Furthermore, as shown, the steering system 2 may also include an overlay steering arrangement 6. The steering system 2 has a steering gear 8, which is designed as a rack-and-pinion steering gear, for example. In this description rack-and-pinion steering is predominantly assumed, wherein the steering gear comprises a pinion 10 and a rack 12. The steering gear 8 is connected via the pinion 10 and the rack 12 on each side of the vehicle to a steering rod 14, each of which interacts with a wheel 16. In principle, the steering system 2 represents one of a variety of possible embodiments of suitable devices for carrying out the method according to the disclosure. For example, a drive unit can also be located on the steering column. Other embodiments may thus be implemented by other steering gears or by a different arrangement of drives. In particular, in one embodiment the steering system 2 is a steer-by-wire steering system. Furthermore, further sensors may be arranged in the steering system, the arrangement and implementation of which are not addressed at this point.

A steering means 20, for example a steering wheel, is arranged on a torsion bar 18. In a normal operating mode of the steering system 2, the angle of the steering means applied by the driver can be applied to the steering gear increased or reduced by means of the overlay steering 6. This steering angle difference, which is introduced into the steering gear 8 by the overlay steering 6, is also referred to as the auxiliary steering angle. Of course, instead of a torsion bar 26, a steering column may be arranged between the steering means 28 and the overlay steering 6. In this embodiment the torsion bar is arranged between the overlay steering 6 and the power steering 4.

The power steering 4 comprises a motor, which can also be referred to as a drive unit 22, and a gearbox 24. A control unit 26 is assigned to the power steering 4. The drive unit 22 acts on the rack 12 via the gearbox 24. The control unit 26 has a microprocessor 28, which is connected to a memory element 30 via a data line. The microprocessor 28 can also be referred to as a digital computing device on which the methods described here can be executed. The memory element 30 can also be referred to as a storage medium. A computer program to be run on the microprocessor 28 can be stored on the memory element 30.

A torsion bar torque 34 determined by a sensor 32 is fed to the control unit 26. Depending on the delivered torsion bar torque 34, the control unit 26 determines a supporting torque 36, which represents a target value for a supporting torque to be applied and is accordingly delivered to the drive unit 22 converted as the control variable.

The power steering 4 comprises a position sensor 38, which determines an actual rack position 40 and feeds this to the control unit 26. Furthermore, the motor vehicle comprises a speed sensor 42, which determines an actual vehicle speed 44 and feeds this to the control unit 26. Alternatively, the actual vehicle speed 44 can also be fed to the control unit 26 from another control unit.

Figure 2:
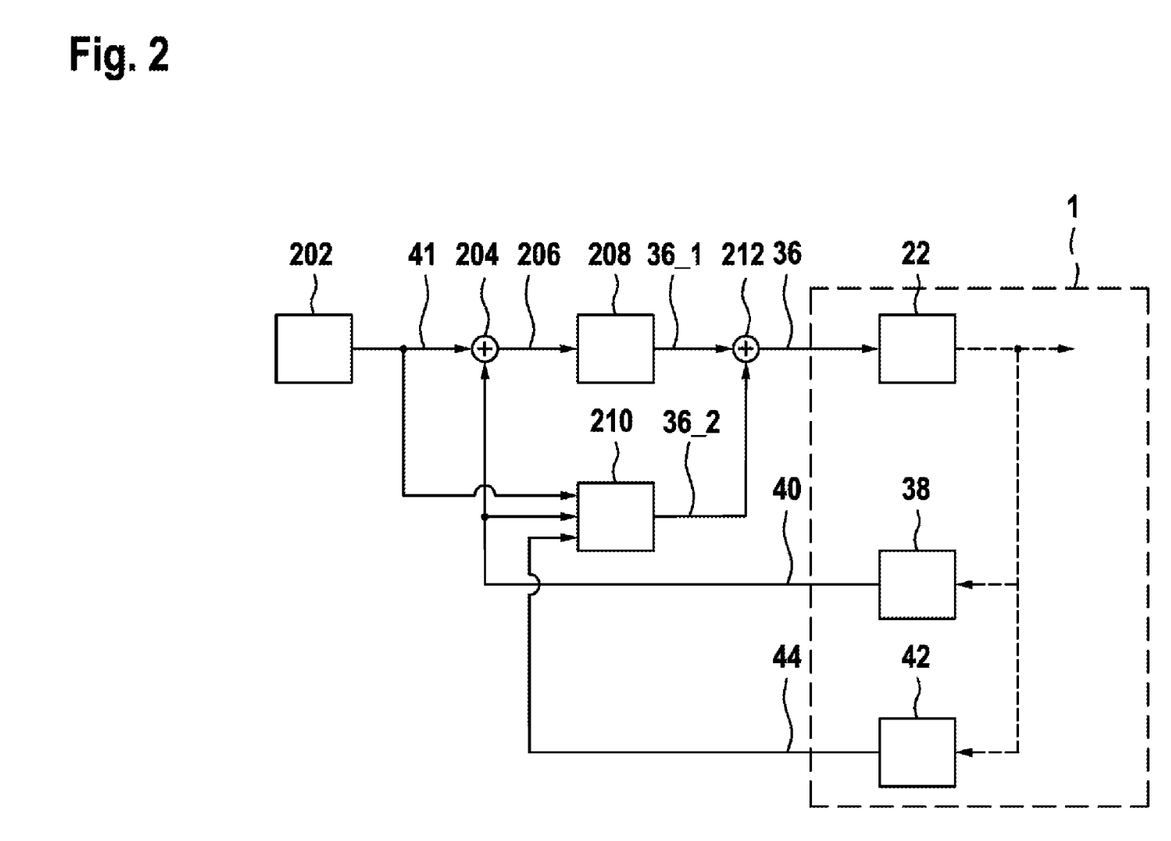
FIG. 2 shows a schematic block diagram of a method for operating the steering system.

FIG. 2 shows a schematic block diagram of a method for operating the steering system. The motor vehicle 1 comprises the drive unit 22 as well as the position sensor 38 and the speed sensor 42. A block 202 determines a target rack position 41. At an addition point 204, a control difference 206 is determined as a function of the actual rack position 40 and as a function of the target rack position 41. The control difference 206 is fed to a controller 208, which determines a first torque 36_1.

A pre-control 210 determines a second torque 36_2 as a function of the target rack position 41, as a function of the actual rack position 40 and as a function of the actual vehicle speed 44. The supporting torque 36 is determined as a function of the sum of the first torque and the second torque 36_1, 36_2, wherein the sum is formed by the addition point 212. The supporting torque 36 is fed to the drive unit 22 as a signal to introduce the supporting torque 36 into the steering gear as a physical variable.

Figure 3:
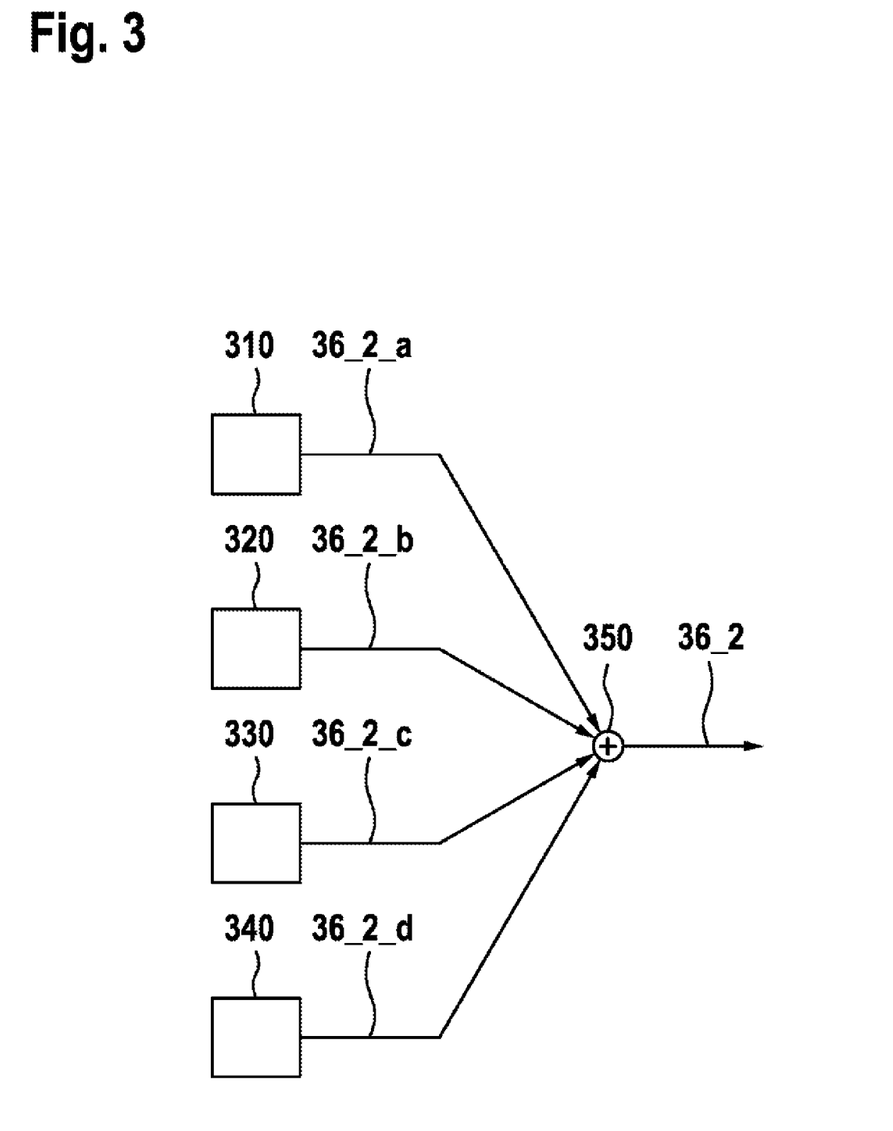
FIG. 3 shows a schematic block diagram of a method for operating the steering system.

FIG. 3 shows a schematic block diagram for determining the second torque 36_2. A first block 310 determines a first partial torque 36_2_a of the second torque 36_2. The first block 310 is used for the pre-control and determination of compensation forces that counteract forces that are present in a static situation. The static situation includes an essentially constant vehicle speed and an essentially constant rack position. The aforementioned forces may be caused, for example, by lateral forces during cornering, the axle working and the axles being reset. Lateral acceleration and vehicle mass are significant factors influencing the lateral force during cornering. The steering process and the current rack position influence the linear working of the axle. The resetting of the axle depends on the design characteristics of the axle. Different structural designs of the axle require different resetting forces to act depending on an actual rack position and an actual vehicle speed. The aforementioned forces can be pre-controlled and/or compensated together, as there is a dependency on the actual vehicle speed and the actual rack position.

A second block 320 determines a second partial torque 36_2_b of the second torque 36_2. The second partial torque 36_2 is provided for compensation of the friction, which decreases with increased vehicle speed. A third block 330 determines a third partial torque 36_2_c of the second torque 36_2. The third partial torque 36_2_c is provided to compensate for a mass inertia of the mechanical components involved in the area of steering and/or power steering. A fourth block 340 determines a fourth partial torque 36_2_d of the second torque 36_2. The fourth partial torque 36_2_d is provided for compensation of the inertia and friction originating from the steering column.

The second torque 36_2 is formed by means of an addition point 350, to which the first to fourth partial torques 36_2_a to 36_2_d are fed. The first to fourth partial torques 36_2_a to 36_2_d are filtered in an embodiment that is not shown, wherein a suitable filter is a moving average filter or a 1st order low-pass filter, for example.

Figure 4:
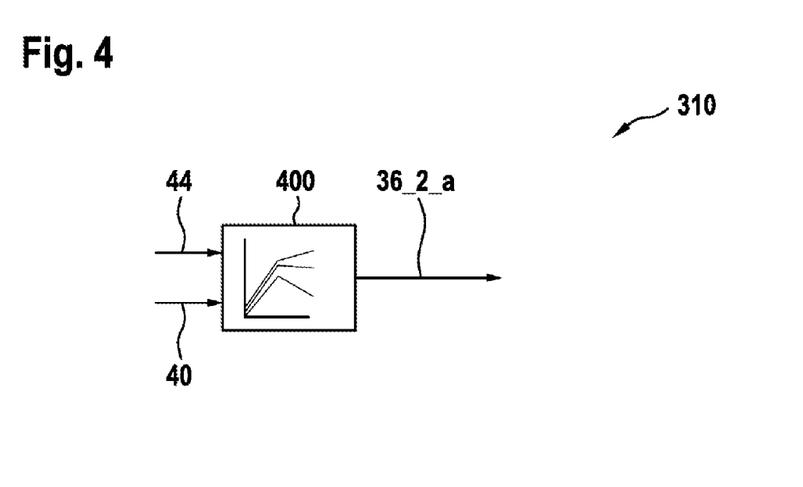
FIG. 4 shows a schematic block diagram of a method for operating the steering system.

FIG. 4 shows an embodiment of block 310 from FIG. 3. A characteristic field 400 determines the first partial torque 36_2_a as a function of the actual vehicle speed 44 and as a function of the actual rack position 40. For example, the characteristic field 401 is available in previously applied form. In a further embodiment, instead of the characteristic field 400 a calculation rule is used—for example a polynomial.

Figure 5:
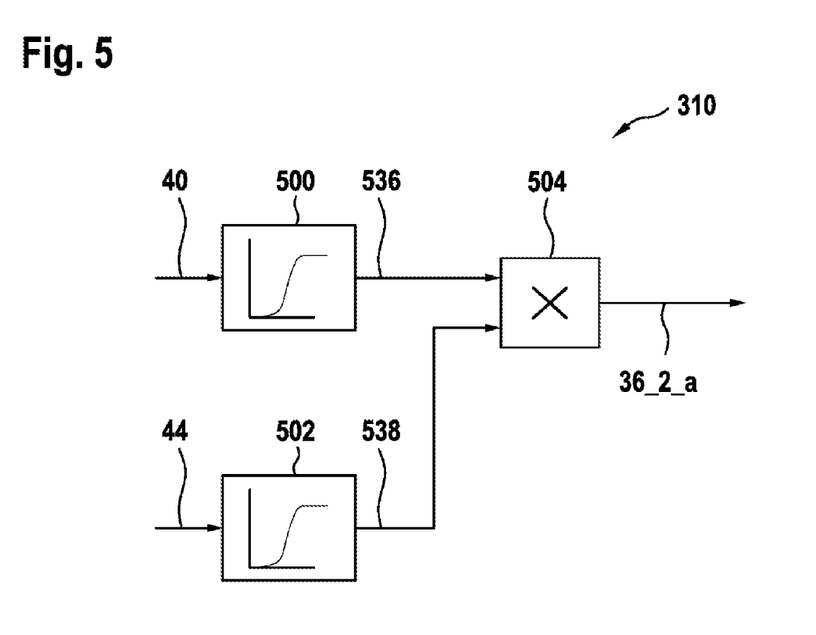
FIG. 5 shows a schematic block diagram of a method for operating the steering system.

FIG. 5 shows an embodiment of the block 310 from FIG. 3. As an alternative to the characteristic field 400 of FIG. 4, a partial torque 536 is determined as a function of the actual rack position 40 by means of a first characteristic curve 500. Using a second characteristic curve 502, a factor 538 is determined as a function of the actual vehicle speed 44. The factor 538 thus corresponds to a predetermined factor. According to a block 504, the first partial torque 36_2_a is the product of the partial torque 536 and the factor 538. In a further embodiment, instead of the characteristic curves 500, 502 a respective calculation rule is used—for example a polynomial.

Figure 6:
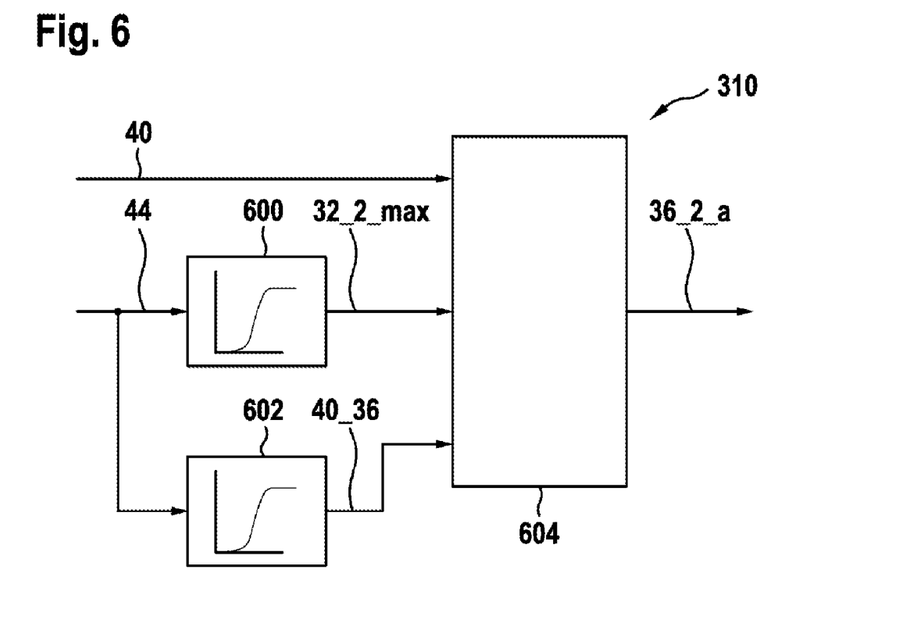
FIG. 6 shows a schematic block diagram of a method for operating the steering system.

FIG. 6 shows an embodiment of the block 310 from FIG. 3. Using a characteristic curve 600, a maximum torque 36_2 max is determined as a function of the actual vehicle speed 44. Using a characteristic curve 602, the rack position 40_36 matching the maximum torque 36_2 max is determined. A block 604 determines the first partial torque 36_2_a as a function of the actual rack position 40, as a function of the maximum torque 36_2 max and the matching rack position 40_36. In a further embodiment, instead of the characteristic curves 600, 602 a respective calculation rule is used—for example a polynomial.

For example, block 604 interpolates the counterforce in the following way. At a vehicle speed of 30 km/h, the maximum counterforce is 2000N. The rack position, at which 2000N is acting, is 50 mm. If the current rack position is 25 mm, the result is 1000 N=(25 mm/50 mm)*2000N. If the current rack position is greater than or equal to 50 mm, 2000 N results as the counterforce.

Figure 7:
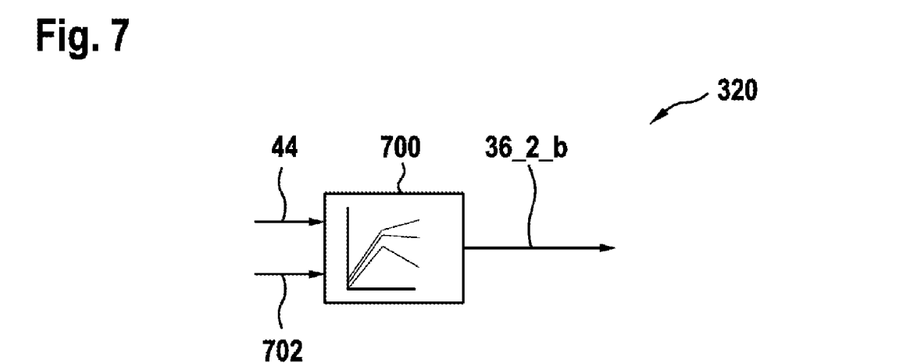
FIG. 7 shows a schematic block diagram of a method for operating the steering system.

FIG. 7 shows an embodiment of block 320 from FIG. 3. Using a characteristic field 700, the second partial torque 36_2_b is determined as a function of the actual vehicle speed 44 and as a function of a rack speed 702. As a result a compensation force in the sense of the second partial torque 36_2_b is determined, which represents the friction between the tire and the road. As the vehicle speed increases, friction between the tires and the road decreases. With increasing rack speed, friction increases. The rack speed 702 can be present as an actual value or as a target value and can be determined as a function of the actual rack position or as a function of the target rack position. In a further embodiment, instead of the characteristic field 700, a calculation rule is used—for example a polynomial.

Figure 8:
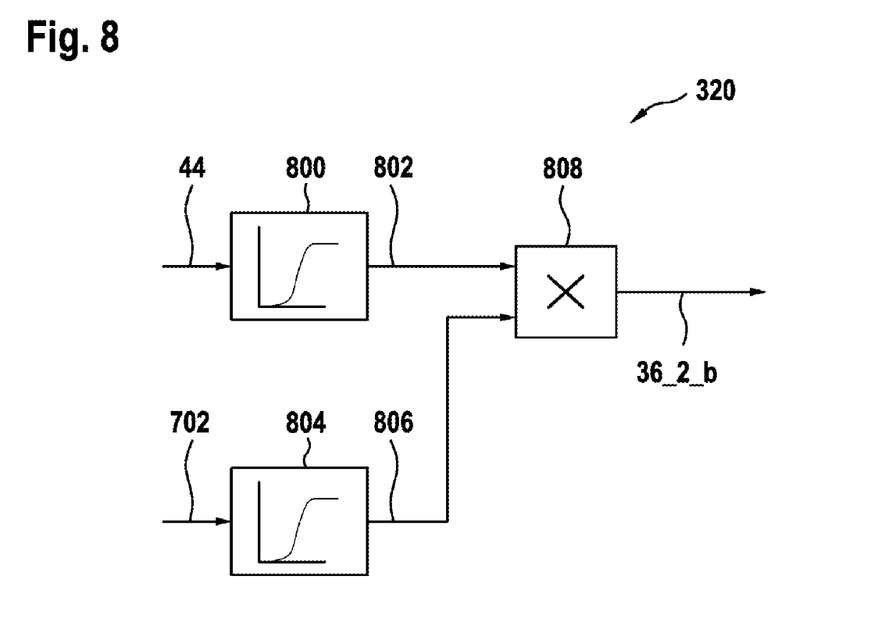
FIG. 8 shows a schematic block diagram of a method for operating the steering system.

FIG. 8 shows an embodiment of block 320 from FIG. 3. A scaling factor 802 is determined from the actual vehicle speed 44 using a characteristic curve 800. The scaling factor 802 thus corresponds to a predetermined factor. As a function of the rack speed 702, a partial torque 806 is determined by means of a characteristic curve 804 and is multiplied by the scaling factor 802 according to a multiplication point 808, from which the second partial torque 36_2_b results. In a further embodiment, instead of the characteristic curves 800, 802 a calculation rule is used—for example a polynomial.

Figure 9:
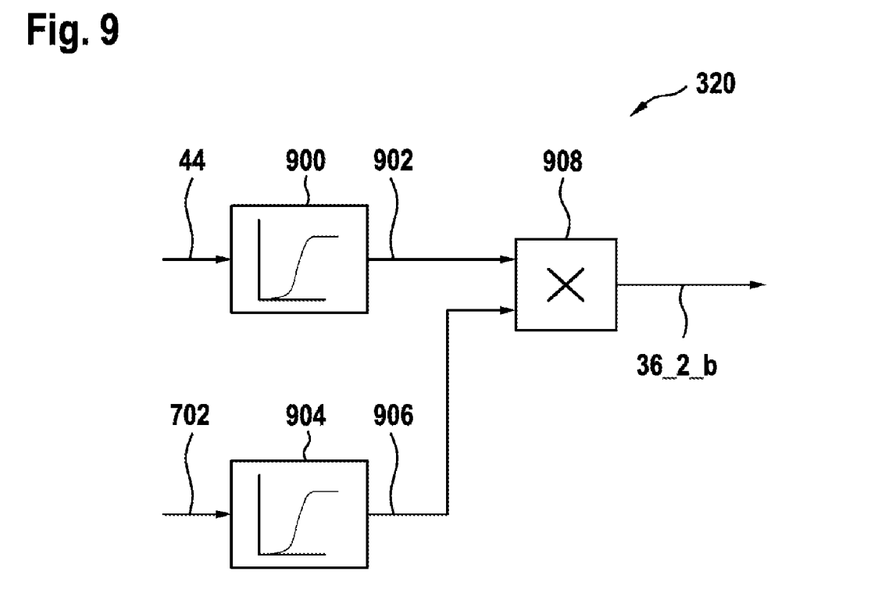
FIG. 9 shows a schematic block diagram of a method for operating the steering system.

FIG. 9 shows an embodiment of block 320 from FIG. 3. A partial torque 902 is determined as a function of the actual vehicle speed 44 using a characteristic curve 900. A scaling factor 906 is determined as a function of the rack speed 702 using a characteristic curve 904. The scaling factor 906 thus corresponds to a predetermined factor. According to the multiplication point 908, the second partial torque 36_2_b is determined as a function of the partial torque 902 and the scaling factor 906. In a further embodiment, instead of the characteristic curve 900 a calculation rule is used—for example a polynomial.

Figure 10:
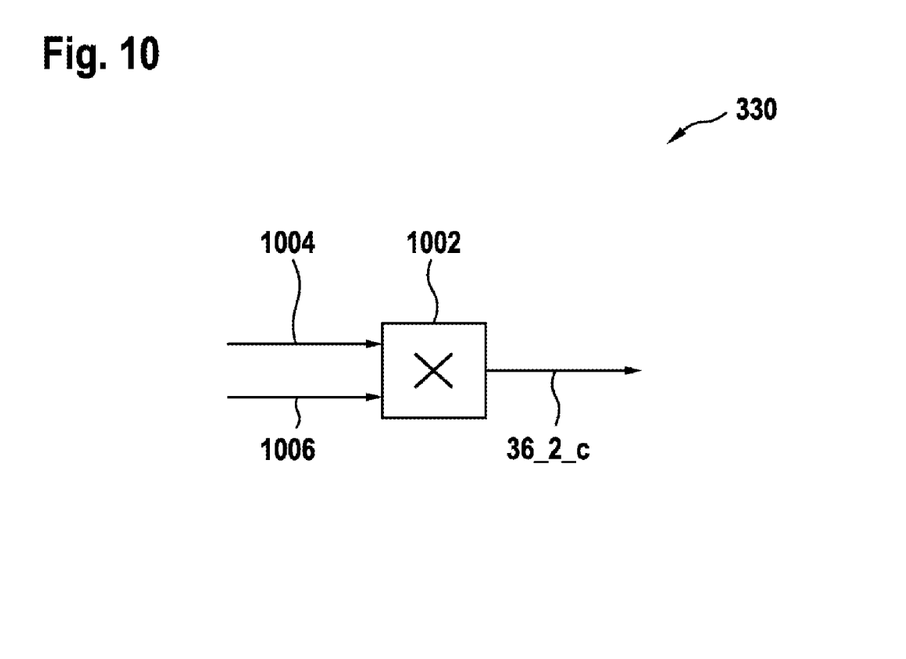
FIG. 10 shows a schematic block diagram of a method for operating the steering system.

FIG. 10 shows an embodiment of block 330 from FIG. 3. The third partial torque 36_2_c results from a multiplication of a rack acceleration 1004 with an inertia factor 1006 according to a multiplication point 1002. The inertia factor 1006 thus corresponds to a predetermined factor. For example, the rack acceleration 1004 is determined as a function of the actual rack position or the target rack position.

Figure 11:
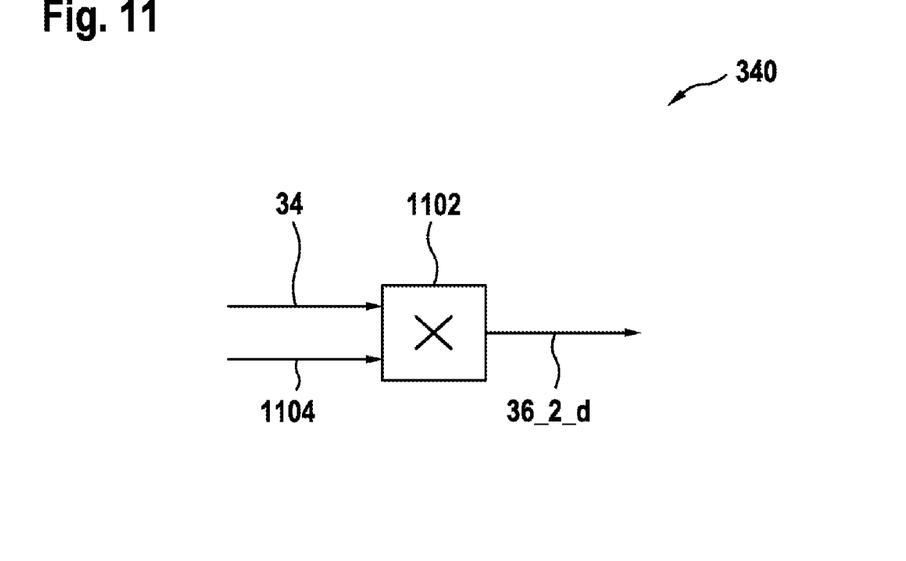
FIG. 11 shows a schematic block diagram of a method for operating the steering system.

FIG. 11 shows an embodiment of block 340 from FIG. 3. The fourth partial torque 36_2_d results from a multiplication of the actual torsion bar torque 34 with a scaling factor 1104 according to a point 1002. The scaling factor 1104 thus corresponds to a predetermined factor.

To reduce steering wheel rotational vibrations, the fourth partial torque 36_2_d is multiplied by −1 in a form that is not shown, i.e. the sign is inverted. This achieves a boost instead of compensation. As a result, the rack is inhibited in its acceleration and the undesirable rotational vibrations are reduced and thus the performance of the controller is improved.

The invention claimed is:

1. A method for operating a steering system of a motor vehicle, comprising:
    determining a first torque as a function of a target rack position and as a function of an actual rack position using a controller;
    determining a second torque as a function of the target rack position, as a function of the actual rack position, and as a function of a vehicle speed using a pre-control;
    determining a first partial torque of the determined second torque as a function of the actual rack position and as a function of the vehicle speed;
    determining a second partial torque of the determined second torque as a function of an actual rack speed or a target rack speed;
    determining a supporting torque as a function of the determined first torque and the determined second torque; and
    applying the supporting torque to a steering gear of the steering system.

2. The method as claimed in claim 1, further comprising:
    determining a third partial torque of the determined second torque as a function of a product of an actual rack acceleration or a target rack acceleration with a predetermined first factor.

3. The method as claimed in claim 2, further comprising:
    determining a fourth partial torque of the determined second torque as a function of a product of an actual torsion bar torque with a predetermined second factor.

4. A steering system of a motor vehicle, comprising:
    a control unit including a controller and a pre-control;
    a drive unit;
    a position sensor configured to determine an actual rack position;
    a speed sensor configured to determine a vehicle speed; and
    a steering gear,
    wherein the controller is configured to determine a first torque as a function of a target rack position and as a function of the actual rack position,
    wherein the pre-control is configured to determine a second torque as a function of the target rack position, as a function of the actual rack position, and as a function of the vehicle speed,
    wherein the control unit is configured to determine a supporting torque as a function of the determined first torque and the determined second torque,
    wherein the drive unit is configured to apply the determined supporting torque to the steering gear using the drive unit,
    wherein the control unit is further configured to determine (i) a first partial torque of the determined second torque as a function of the actual rack position and as a function of the vehicle speed, and (ii) a second partial torque of the determined second torque as a function of an actual rack speed or a target rack speed.

5. The steering system as claimed in claim 4, wherein the control unit is further configured to determine a third partial torque of the determined second torque as a function of a product of an actual rack acceleration or a target rack acceleration with a predetermined first factor.

6. The steering system as claimed in claim 5, wherein the control unit is further configured to determine a fourth partial torque of the determined second torque as a function of a product of an actual torsion bar torque with a predetermined second factor.

7. The steering system as claimed in claim 4, wherein the control unit is configured to determine the supporting torque by adding the determined first torque to the determined second torque.

8. A method for operating a steering system of a motor vehicle, comprising:
    determining a first torque as a function of a target rack position and as a function of an actual rack position using a controller;
    determining a second torque as a function of the target rack position, as a function of the actual rack position, and as a function of a vehicle speed using a pre-control;
    determining a supporting torque as a function of the determined first torque and the determined second torque; and
    applying the supporting torque to a steering gear of the steering system, wherein determining the supporting torque comprises adding the determined first torque to the determined second torque.

9. The method as claimed in claim 8, further comprising:
determining a first partial torque of the determined second torque as a function of the actual rack position and as a function of the vehicle speed.

10. The method as claimed in claim 9, further comprising:
determining a second partial torque of the determined second torque as a function of an actual rack speed or a target rack speed.

11. The method as claimed in claim 10, further comprising:
determining a third partial torque of the determined second torque as a function of a product of an actual rack acceleration or a target rack acceleration with a predetermined first factor.

12. The method as claimed in claim 11, further comprising:
determining a fourth partial torque of the determined second torque as a function of a product of an actual torsion bar torque with a predetermined second factor.

* * * * *